United States Patent
Lin

(10) Patent No.: US 11,822,497 B2
(45) Date of Patent: Nov. 21, 2023

(54) USB DEVICE, USB CABLE AND USB REPEATER THEREOF

(71) Applicant: GENESYS LOGIC, INC., New Taipei (TW)

(72) Inventor: Ching-Hsiang Lin, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 162 days.

(21) Appl. No.: 17/494,839

(22) Filed: Oct. 6, 2021

(65) Prior Publication Data

US 2022/0138135 A1 May 5, 2022

(30) Foreign Application Priority Data

Oct. 29, 2020 (TW) ................... 109137656

(51) Int. Cl.

| | | |
|---|---|---|
| *G06F 13/14* | (2006.01) | |
| *G06F 13/38* | (2006.01) | |
| *G06F 13/42* | (2006.01) | |
| *G06F 13/40* | (2006.01) | |

(52) U.S. Cl.
CPC ........ *G06F 13/387* (2013.01); *G06F 13/4045* (2013.01); *G06F 13/4221* (2013.01)

(58) Field of Classification Search
CPC .............. G06F 13/387; G06F 13/4045; G06F 13/4221; G06F 2213/0042; G06F 13/4295; G06F 13/4282; Y02D 10/00
See application file for complete search history.

(56) References Cited

U.S. PATENT DOCUMENTS

| | | | |
|---|---|---|---|
| 8,799,537 B1 | 8/2014 | Zhu et al. | |
| 2011/0062794 A1* | 3/2011 | Vergoossen | H04N 21/436 |
| | | | 307/125 |
| 2015/0227489 A1* | 8/2015 | Chen | G06F 13/385 |
| | | | 710/313 |
| 2016/0285757 A1 | 9/2016 | Srivastava et al. | |
| 2016/0335222 A1* | 11/2016 | Schnell | G06F 13/385 |
| 2017/0286360 A1* | 10/2017 | Srivastava | G06F 13/4295 |
| 2018/0287771 A1* | 10/2018 | Srivastava | G06F 13/4072 |
| 2019/0068397 A1 | 2/2019 | Chen | |
| 2019/0288743 A1* | 9/2019 | Wang | H04L 25/24 |

FOREIGN PATENT DOCUMENTS

| | | |
|---|---|---|
| CN | 110275855 | 9/2019 |
| IN | 201817010584 | 7/2018 |
| TW | 201935301 | 9/2019 |

OTHER PUBLICATIONS

"Office Action of Taiwan Counterpart Application", dated Nov. 15, 2021, p. 1-p. 6.
"Office Action of China Counterpart Application", dated Jun. 14, 2023, p. 1-p. 9.

* cited by examiner

*Primary Examiner* — Henry Tsai
*Assistant Examiner* — Kim T Huynh
(74) *Attorney, Agent, or Firm* — JCIPRNET

(57) ABSTRACT

The disclosure provides a USB device, a USB cable, and a USB repeater. The USB cable or the USB device includes a USB connector and the USB repeater. The USB repeater may gain a signal of a differential pin pair of the USB connector. The USB repeater may monitor a signal of a configuration channel pin of the USB connector. The USB repeater selectively runs in one of a plurality of working modes corresponding to a plurality of protocols according to a monitoring result.

20 Claims, 1 Drawing Sheet

USB DEVICE, USB CABLE AND USB REPEATER THEREOF

CROSS-REFERENCE TO RELATED APPLICATION

This application claims the priority benefit of Taiwan application serial no. 109137656, filed on Oct. 29, 2020. The entirety of the above-mentioned patent application is hereby incorporated by reference herein and made a part of this specification.

BACKGROUND

Technical Field

The disclosure relates to an electronic device, and in particularly, relates to a USB device, a USB cable, and a USB repeater.

Description of Related Art

Universal serial bus (USB) is widely used as a data transmission interface between a host and a device. In addition to the USB protocol, based on application needs, the USB data transmission path may be applied to other protocols, such as the DisplayPort (DP) protocol, the Thunderbolt protocol, and the High Definition Multimedia Interface (HDMI) Protocol, or other protocols. The PD controller of the host may negotiate the USB configuration (to run in which the protocol) with the PD controller of the device through the configuration channel (CC) pin of the USB connector.

A USB repeater may be used in the USB data transmission path so that the distance of data transmission may be extended. For the application of the USB repeater, it is important to take different protocols (such as the USB3 protocol, the USB4 protocol, the DP protocol, the Thunderbolt protocol, the HDMI protocol, or other protocols) into consideration, so that the USB data transmission path may work normally or may save energy effectively. Generally, the power delivery (PD) controller may issue a command (provide an operating parameter) to the USB repeater through the inter-integrated circuit (I2C) interface or the general purpose input/output (GPIO) interface, so that the USB repeater provides different modes (which is adapted to different protocols). The working mode switching of the USB repeater depends on (or is related to) the firmware version of the power delivery controller. For different application systems, the PD controller needs to be loaded with different corresponding firmware versions. Multiple firmware versions mean significant production costs and customer service effort.

Furthermore, when the USB repeater is disposed on the USB cable, a conventional USB cable needs to be additionally equipped with a PD controller to control the working mode switching of the USB repeater. In addition to the aforementioned issues of multiple firmware versions that occur when the PD controller is disposed on the USB cable, the additionally-disposed PD controller may also lead to an increase in costs of the USB cable.

It should be noted that the content of the BACKGROUND" paragraph is used to help understand the disclosure. Part of the content (or all of the content) disclosed in the "BACKGROUND" paragraph cannot be the conventional technology known to those with ordinary knowledge in the technical field. The content disclosed in the "Description of Related Art" paragraph does not mean that the content has been known to those with ordinary knowledge in the technical field before the application of the disclosure.

SUMMARY

The disclosure provides a universal serial bus (USB) device, a USB cable, and a USB repeater thereof to selectively run in one of a plurality of working modes corresponding to a plurality of protocols.

In an embodiment of the disclosure, a USB cable includes a first USB connector and a first USB repeater. The first USB repeater is coupled to a first differential pin pair of the first USB connector. The first USB repeater is configured to gain a signal of the first differential pin pair. The first USB repeater is configured to perform a monitoring operation on a signal of a first configuration channel (CC) pin of the first USB connector. The first USB repeater selectively runs in one of a plurality of working modes corresponding to a plurality of protocols according to a result of the monitoring operation.

In an embodiment of the disclosure, a USB repeater includes a signal repeating circuit and a monitor circuit. The signal repeating circuit is adapted to be coupled to a differential pin pair of a USB connector. The signal repeating circuit is configured to gain a signal of the differential pin pair according to at least one operating parameter. The monitor circuit is adapted to be coupled to a configuration channel pin of the USB connector for performing a monitoring operation. The monitor circuit selectively adjusts the at least one operating parameter according to a result of the monitoring operation, such that the signal repeating circuit is selectively applicable to one of a plurality of protocols.

In an embodiment of the disclosure, a USB device includes a USB connector, a power delivery (PD) controller, a host circuit, and a USB repeater. The power delivery controller is coupled to a configuration channel pin of the USB connector. The host circuit is coupled to the power delivery controller. The USB repeater is coupled to a first protocol terminal pair and a second protocol terminal pair of the host circuit. The USB repeater is further coupled to a differential pin pair of the USB connector. The USB repeater is configured to gain a signal of the differential pin pair. The USB repeater is configured to perform a monitoring operation on a signal of the configuration channel pin. The USB repeater selectively runs in one of a plurality of working modes corresponding to a plurality of protocols according to a result of the monitoring operation.

Based on the above, the USB repeater according to the embodiments of the disclosure may monitor the signal of the configuration channel pin. According to the monitoring result, the USB repeater may learn which protocol (which working mode) that the differential pin pair of the USB connector is about to run in and then selectively runs in one of the working modes corresponding to the protocols. Therefore, the working mode switching of the USB repeater may be independent of (or irrelevant to) the firmware version of the power delivery controller.

In order to make the aforementioned features and advantages of the disclosure comprehensible, embodiments accompanied with drawings are described in detail below.

DETAILED DESCRIPTION OF DISCLOSED EMBODIMENTS

Figure 1:
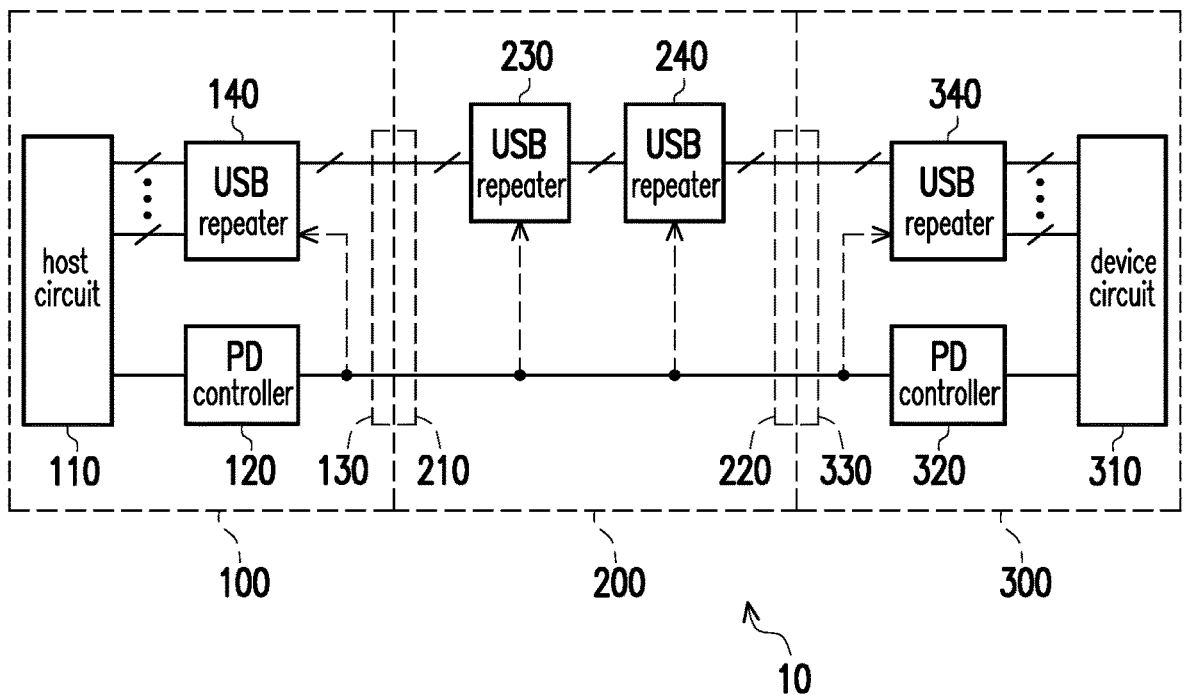
FIG. 1 is a schematic diagram of circuit blocks of a universal serial bus (USB) system according to an embodiment of the disclosure.

The term "coupled (or connected)" used in the full text of the description of this case (including the scope of the patent application) can refer to any direct or indirect connection means. For example, if the text describes that the first device is coupled (or connected) to the second device, the text should be interpreted as that the first device can be directly connected to the second device, or the first device can be indirectly connected to the second device through other devices or some connection means. The terms "first" and "second" mentioned in the full text of the description of this case (including the scope of the patent application) are used to name the element, or distinguish different embodiments or ranges and is not used to limit the upper or lower limit of the number of components, and is not used to limit the order of components. In addition, wherever possible, elements/components/steps with the same reference numerals in the drawings and embodiments represent the same or similar parts. Elements/components/steps that use the same reference numerals or use the same terms in different embodiments can refer to related descriptions.

FIG. 1 is a schematic diagram of circuit blocks of a universal serial bus (USB) system 10 according to an embodiment of the disclosure. The USB system 10 shown in FIG. 1 includes a USB host 100, a USB cable 200, and a USB device 300. According to application needs and design needs, the USB device 300 may include a data storage device, a display, and/or other USB devices. The USB host 100 may include a tablet computer, a personal computer, and/or other electronic apparatuses. The USB host 100 includes a host circuit 110 and a power delivery (PD) controller 120, and the USB device 300 includes a device circuit 310 and a PD controller 320. According to design needs, the host circuit 110 may include a USB controller, an application processor (AP), a central processing unit (CPU), and/or other processing circuits. The device circuit 310 may include a USB control, an application processor, a microcontroller, a microprocessor, and/or other processing circuits. The PD controller 120 is coupled to the host circuit 110, and the PD controller 320 is coupled to the device circuit 310. According to design needs, the PD controller 120 and the PD controller 320 may be PD controllers that comply with the USB specifications. The USB specifications are commonly-known documents, so description thereof is not provided herein.

A USB connector 210 of the USB cable 200 is electrically connected to the USB connector 130 of the USB host 100. A USB connector 220 of the USB cable 200 is electrically connected to a USB connector 330 of the USB device 300. In addition, the PD controller 120 is coupled to a configuration channel (CC) pin of the USB connector 130. The CC pin of the USB connector 130 is electrically connected to a CC pin of the USB connector 210. The CC pin of the USB connector 210 is coupled to a CC pin of the USB connector 220. The CC pin of the USB connector 220 is electrically connected to a CC pin of the USB connector 330. The CC pin of the USB connector 330 is coupled to the PD controller 320. Therefore, the PD controller 120 may be coupled to the PD controller 320 through the CC pins of the USB connector 130, the USB connector 210, the USB connector 220, and the USB connector 330. According to design needs, each of the CC pins may be a CC1 pin, a CC2 pin, or a CC pin specified by the USB specifications. It should be noted that a Rp resistor, a Rd resistor, and a Ra resistor specified by the USB specifications are not shown in FIG. 1. The PD controller 120 and the PD controller 320 are able to negotiate a USB configuration with each other through the CC pins. According to the design needs, a communication protocol at the CC pin is specified in the USB specifications, so description thereof is not provided herein.

The host circuit 110 may transmit data to the device circuit 310 through the differential pin pairs of the USB connector 130, the USB connector 210, the USB connector 220, and the USB connector 330. According to design needs, the differential pin pairs may include D+ and D− pin pairs, TX1+ and TX1+ pin pairs, RX1+ and RX1− pin pairs, TX2+ and TX2− pin pairs, and/or) RX2+ and RX2− pin pairs specified in the USB specifications. The differential pin pairs of the USB connector 130, the USB connector 210, the USB connector 220, and the USB connector 330 may provide one or more high-speed data transmission channels. In addition to a USB protocol (USB specifications), based on application needs, the differential pin pair (high-speed data transmission channel) may be applied to other protocols, such as a DisplayPort (DP) protocol, a Thunderbolt protocol, a High Definition Multimedia Interface (HDMI) protocol, and/or other protocols. The host circuit 110 may dynamically determine to run in one of a plurality of working modes corresponding to a plurality of protocols according to configuration information provided by the PD controller 120, and/or the device circuit 310 may dynamically determine to run in one of the working modes corresponding to the protocols according to configuration information provided by the PD controller 320.

One or more USB repeaters may be used in a high-speed data transmission channel (a USB data transmission path) between the host circuit 110 and the device circuit 310, and that a distance of data transmission may thus be extended. A number of the USB repeaters may be determined according to design needs. For example, in the embodiment shown in FIG. 1, a USB repeater 140 is disposed in the USB host 100. USB repeaters 230 and 240 are disposed at two ends of the USB cable 200. A USB repeater 340 is disposed in the USB device 300. In detail, the USB repeater 140 is coupled between a protocol terminal pair of the host circuit 110 and the differential pin pair of the USB connector 130. The USB repeater 230 is coupled between the differential pin pair of the USB connector 210 and the USB repeater 240. The USB repeater 240 is coupled between the USB repeater 230 and the differential pin pair of the USB connector 220. The USB repeater 340 is coupled between the differential pin pair of the USB connector 330 and a protocol terminal pair of the device circuit 310.

In other embodiments, one or more of the USB repeater 140, the USB repeater 230, the USB repeater 240, and the USB repeater 340 may be omitted according to design needs. For example, when the USB repeater 240 is omitted, two ends of the USB repeater 230 are coupled to the differential pin pair of the USB connector 210 and the differential pin pair of the USB connector 220. When the USB repeater 240 is not omitted, the two ends of the USB repeater 230 are coupled to the differential pin pair of the USB connector 210 and the USB repeater 240, and two ends of the USB repeater 240 are coupled to the USB repeater 230 and the differential pin pair of the USB connector 220.

Since the PD controller 120 and the PD controller 320 may negotiate with each other through the CC pins, the host circuit 110 and the device circuit 310 may selectively run in working modes corresponding to different protocols. Therefore, the USB repeater 140, the USB repeater 230, the USB repeater 240, and the USB repeater 340 are required to take different protocols (e.g., a USB3 protocol, a USB4 protocol, a DP protocol, the Thunderbolt protocol, the HDMI protocol, or other protocols) into consideration, so that the high-speed data transmission channel (USB data transmission path) between the host circuit 110 and the device circuit 310 may work normally or may save energy effectively.

Regarding the USB host 100, one end of the USB repeater 140 is coupled to various protocol terminal pairs (e.g., a first protocol terminal pair and a second protocol terminal pair) of the host circuit 110). For example (but not limited to), the first protocol terminal pair may be a differential data terminal pair adapted to the USB protocol (or other protocols), and the second protocol terminal pair may be a differential data terminal pair adapted to the DP protocol (or other protocols). The other end of the USB repeater 140 is coupled to the differential pin pair (high-speed data transmission channel) of the USB connector 130. The USB repeater 140 may gain a signal of the differential pin pair of the USB connector 130 and then transmits the gained signal to the host circuit 110. Alternatively, the USB repeater 140 may receive a signal from the host circuit 110 and then transmits the gained signal to the differential pin pair of the USB connector 130. The USB repeater 140 may further perform a monitoring operation on a signal of the CC pin of the USB connector 130. According to a monitoring result, the USB repeater 140 may learn which protocol (which working mode) that the differential pin pair of the USB connector 130 is about to run in. Therefore, the USB repeater 140 may selectively run in one of the working modes corresponding to the protocols according to the result of the monitoring operation. The PD controller 120 does not need to issue a command (to provide an operating parameter) to the USB repeater 140. It thus can be seen that working mode switching of the USB repeater 140 may be independent of (or irrelevant to) a firmware version of the PD controller 120. In this way, production costs of the PD controller 120 may be reduced, and customer service effort of the PD controller 120 may be simplified.

Regarding the USB cable 200, the USB repeater 230 and/or the USB repeater 240 may be disposed in the USB cable 200 according to design needs. The USB repeater 230 may gain a signal of the differential pin pair (high-speed data transmission channel) of the USB connector 210 and then transmits the gained signal to the USB repeater 240 (or the differential pin pair of the USB connector 220). For example, an input terminal pair of the USB repeater 230 is coupled to the differential pin pair of the USB connector 210, and an output terminal pair of the USB repeater 230 is coupled to an input terminal pair of the USB repeater 240. Alternatively, the USB repeater 230 may receive a signal from the USB repeater 240 (or the differential pin pair of the USB connector 220) and then transmits the gained signal to the differential pin pair of the USB connector 210. The USB repeater 230 may perform a monitoring operation to a signal of the CC pin of the USB connector 210. The USB repeater 230 may selectively run in one of the working modes corresponding to the protocols according to a result of the monitoring operation. Description of the USB repeater 230 may be deduced by referring to the related description of the USB repeater 140 and thus is not repeated herein.

The USB repeater 240 may gain a signal of the differential pin pair (high-speed data transmission channel) of the USB connector 220 and transmits the gained signal to the USB repeater 230 (or the differential pin pair of the USB connector 210). For example, the input terminal pair of the USB repeater 240 is coupled to the output terminal pair of the USB repeater 230, and the output terminal pair of the USB repeater 240 is coupled to the differential pin pair of the USB connector 220. Alternatively, the USB repeater 240 may receive a signal from the USB repeater 230 (or the differential pin pair of the USB connector 210) and then transmits the gained signal to the differential pin pair of the USB connector 220. The USB repeater 240 may perform a monitoring operation on a signal of the CC pin of the USB connector 220. The USB repeater 240 may selectively run in one of the working modes corresponding to the protocols according to a result of the monitoring operation. Description of the USB repeater 240 may be deduced by referring to the related description of the USB repeater 140 and thus is not repeated herein.

It should be noted that when the USB repeater 230 and/or the USB repeater 240 are disposed on the USB cable 200, work mode switching of the USB repeater 230 and/or 240 does not need a command (operating parameter) from the PD controller, so that the USB cable 200 does not require an additional PD controller. Cable costs of the USB cable 200 may thus be lowered since the USB cable 200 is not equipped with PD controller.

Regarding the USB device 300, the USB repeater 340 may be disposed in the USB device 300 according to design needs. The USB repeater 340 may gain a signal of the differential pin pair (high-speed data transmission channel) of the USB connector 330 and then transmit the gained signal to the device circuit 310. Alternatively, the USB repeater 340 may receive a signal from the device circuit 310 and then transmits the gained signal to the differential pin pair of the USB connector 330. The USB repeater 340 may monitor a signal of the CC pin of the USB connector 210. The USB repeater 340 may selectively run in one of the working modes corresponding to the protocols according to a result of the monitoring operation. Description of the USB repeater 340 may be deduced by referring to the related description of the USB repeater 140 and thus is not repeated herein.

Figure 2:
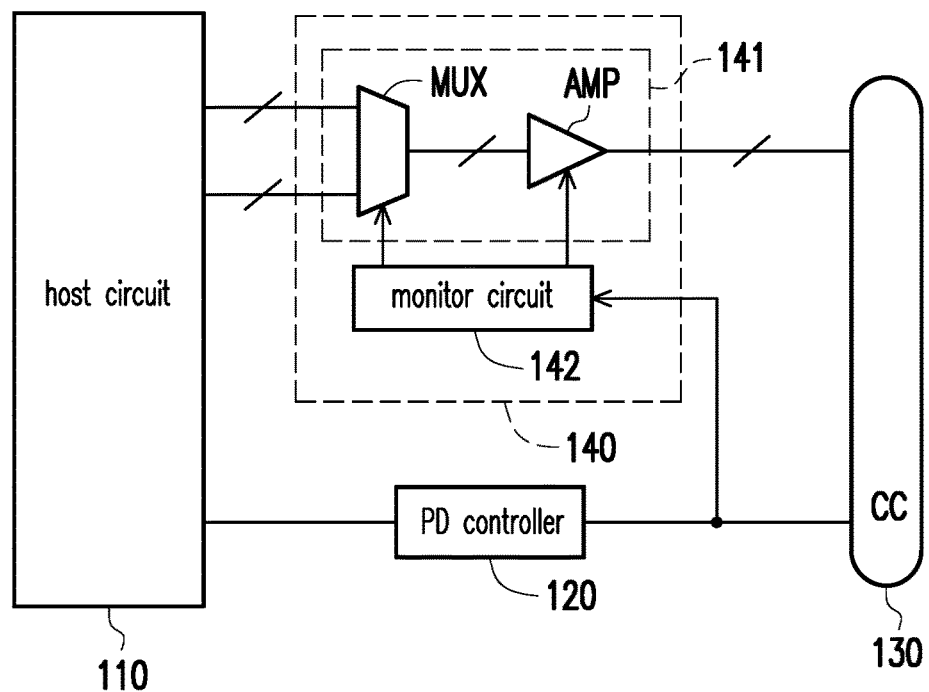
FIG. 2 is a schematic diagram of circuit blocks of a USB repeater shown in FIG. 1 according to an embodiment of the disclosure.

FIG. 2 is a schematic diagram of circuit blocks of a USB repeater shown in FIG. 1 according to an embodiment of the disclosure. Description of the USB repeater 230, the USB repeater 240, and/or the USB repeater 340 shown in FIG. 1 may be deduced by referring to the related description of the USB repeater 140 and thus is not repeated herein. In the embodiment shown in FIG. 2, the USB repeater 140 includes a signal repeating circuit 141 and a monitor circuit 142. The signal repeating circuit 141 is adapted to be coupled to the differential pin pair (high-speed data transmission channel) of the USB connector 130. The signal repeating circuit 141 may gain the signal of the differential pin of the USB connector 130 according to at least one operating parameter. The monitor circuit 142 is adapted to be coupled to the CC pin of the USB connector 130 to perform the monitoring operation. The monitor circuit 142 may selectively adjust the at least one operating parameter according to the result of the monitoring operation, so that the signal repeating circuit 141 is selectively applied to one of the protocols.

The monitor circuit 142 may monitor a message transmitted between the CC pin of the USB connector 130 and the PD controller 120 (a negotiation message between the PD controller 120 and the PD controller 320). For example, when the signal of the CC pin of the USB connector 130 includes a message "Hard_Reset", a message "Data_Reset", and/or a message "Exit_Mode", the monitor circuit 142 may control the signal repeating circuit 141 to selectively return to a default working mode. According to design needs, the default working mode includes a USB3 protocol mode or multiple working modes corresponding to other USB protocols (for example, a USB2 protocol mode or a USB4 protocol mode). When the signal of the CC pin of the USB connector 130 includes a message "Enter_USB", the monitor circuit 142 may selectively switch the working mode of the signal repeating circuit 141 to a USB working mode. According to design needs, the USB working mode includes the USB2 protocol mode, the USB3 protocol mode, or the USB4 protocol mode. When the signal of the CC pin of the USB connector 130 includes a message "Enter_Mode", the monitor circuit 142 may selectively switch the working mode of the signal repeating circuit 141 to a DP protocol mode, a Thunderbolt protocol mode, or a HDMI protocol mode according to the standard or vendor ID (SVID). When the signal of the CC pin of the USB connector 130 includes a message "DisplayPort_Configure", the monitor circuit 142 may switch the working mode of the signal repeating circuit 141 to a configuration mode to configure an appropriate DP pin assignment (DisplayPort pin assignment). When the signal of the CC pin of the USB connector 130 includes a message "DisplayPort_Status_Update" or a message "DisplayPort_Attention", the monitor circuit 142 may switch the working mode of the signal repeating circuit 141 to a power-saving mode to save power according to a hot plug detection status. The message "Hard_Reset", the message "Data_Reset", the message "Exit_Mode", the message "Enter_USB", the message "Enter_Mode", the message "DisplayPort_Configure", the message "DisplayPort_Status_Update", and the message "DisplayPort_Attention" are specified in the USB specification, and details thereof are not provided.

In the embodiment shown in FIG. 2, the signal repeating circuit 141 includes, for example, an amplifier AMP and a routing circuit MUX. A first terminal pair (e.g., an output differential pair) of the amplifier AMP is adapted to be coupled to the differential pin pair (high-speed data transmission channel) of the USB connector 130. The monitor circuit 142 may output a first operating parameter to the amplifier AMP, such that the amplifier AMP may be selectively applied to one of the protocols. A common terminal pair of the routing circuit MUX is coupled to a second terminal pair of the amplifier AMP (e.g., an input differential pair). A first selecting terminal pair of a plurality of selecting terminal pairs of the routing circuit MUX is adapted to be coupled to the first protocol terminal pair of the host circuit 110, and a second selecting terminal pair of the selecting terminal pairs of the routing circuit MUX is adapted to be coupled to the second protocol terminal pair connected to the host circuit 110. For example, according to design needs, the first protocol terminal pair may be a differential data terminal pair adapted to the first protocol (e.g., one of the USB3 protocol, the USB4 protocol, the DP protocol, the Thunderbolt protocol, and the HDMI protocol), and the second protocol terminal pair may be a differential data terminal pair adapted to the second protocol (e.g., another one of the USB3 protocol, the USB4 protocol, the DP protocol, the Thunderbolt protocol, and the HDMI protocol). The monitor circuit 142 may output the second operating parameter to the routing circuit MUX, such that the routing circuit MUX selects one of the selecting terminal pairs to be coupled to the common terminal pair.

According to different design needs, the blocks of the monitor circuit 142 may be implemented as hardware, firmware, or a combination of the foregoing two. In terms of hardware, the blocks of the monitor circuit 142 may be implemented as a logic circuit on an integrated circuit. Related functions of the monitor circuit 142 may be implemented as hardware by using hardware description languages (for example, Verilog HDL or VHDL) or other suitable programming languages. For example, the related functions of the monitor circuit 142 may be implemented in one or more controllers, a microcontroller, a microprocessor, an application-specific integrated circuit (ASIC), a digital signal processor (DSP), a field programmable gate array (FPGA), and/or various logic blocks, modules, and circuits in other processing units. In terms of firmware, the related functions of the monitor circuit 142 may be implemented as a programming code. For example, general programming languages (for example, C, C++, or an assembly language) or other suitable programming languages are used to implement the monitor circuit 142. The controller, the microcontroller, or the microprocessor may read and execute the programming code from the recording medium, so as to realize the related functions of the monitor circuit 142 described above.

Based on the aforementioned, the USB repeater 140, the USB repeater 230, the USB repeater 240, and/or the USB repeater 340 described in the foregoing embodiments may monitor the transmission information of the CC pin of the USB connector. According to the monitoring result, the USB repeater 140, the USB repeater 230, the USB repeater 240, and/or the USB repeater 340 may learn which protocol (which working mode) that the differential pin pair (high-speed data transmission channel) of the USB connector is about to run in and then selectively run in one of the working modes corresponding to the protocols. Therefore, the working mode switching of the USB repeater 140, the USB repeater 230, the USB repeater 240, and/or the USB repeater 340 may be independent of (or irrelevant to) the firmware version of the PD controller.

Although the disclosure has been disclosed in the embodiments, it is not intended to limit the disclosure, anyone with ordinary knowledge in the relevant technical field can make some changes and modifications without departing from the spirit and scope of the disclosure. Therefore, the scope of protection of the disclosure shall be subject to those defined by the attached patent scope.

What is claimed is:
1. A universal serial bus (USB) cable without having a USB power delivery controller, comprising:
   a first USB connector; and
   a first USB repeater, coupled to a first differential pin pair of the first USB connector, configured to gain a signal of the first differential pin pair, wherein the first USB repeater is configured to perform a monitoring operation on a signal of a first configuration channel pin of the first USB connector, and the first USB repeater selectively runs in one of a plurality of working modes corresponding to a plurality of protocols according to a result of the monitoring operation,
   wherein the first USB repeater comprises:
      a signal repeating circuit coupled to the first differential pin pair of the first USB connector; and
      a monitor circuit coupled to the first configuration channel pin of the first USB connector to perform the monitoring operation,
   wherein a working mode of the first USB repeater is switched based only on the result of the monitoring operation provided by the monitor circuit inside the first USB repeater.

2. The USB cable according to claim 1, further comprising:
  a second USB connector, wherein the first USB repeater is further coupled to a second differential pin pair of the second USB connector, and a second configuration channel pin of the second USB connector is coupled to the first configuration channel pin of the first USB connector.

3. The USB cable according to claim 1, further comprising:
  a second USB connector, comprising a second configuration channel pin coupled to the first configuration channel pin of the first USB connector; and
  a second USB repeater, comprising an input terminal pair coupled to an output terminal pair of the first USB repeater, wherein an output terminal pair of the second USB repeater is coupled to a second differential pin pair of the second USB connector.

4. The USB cable according to claim 1,
  wherein the signal repeating circuit is configured to gain the signal of the first differential pin pair according to at least one operating parameter; and
  wherein the monitor circuit selectively adjusts the at least one operating parameter according to the result of the monitoring operation, such that the signal repeating circuit is selectively applied to one of the protocols.

5. The USB cable according to claim 4, wherein the signal repeating circuit comprises:
  an amplifier, comprising a first terminal pair adapted to be coupled to the first differential pin pair of the first USB connector, wherein the monitor circuit outputs a first operating parameter to the amplifier, such that the amplifier is selectively applicable to one of the protocols; and
  a routing circuit, comprising a common terminal pair coupled to a second terminal pair of the amplifier, wherein a first selecting terminal pair of a plurality of selecting terminal pairs of the routing circuit is adapted to be coupled to a first protocol terminal pair of a host circuit, a second selecting terminal pair of the selecting terminal pairs of the routing circuit is adapted to be coupled to a second protocol terminal pair of the host circuit, and the monitor circuit outputs a second operating parameter to the routing circuit, such that the routing circuit selects one of the selecting terminal pairs to be coupled to the common terminal pair.

6. The USB cable according to claim 5, wherein the first protocol terminal pair is applicable to one of a USB3 protocol, a USB4 protocol, a DisplayPort protocol, a Thunderbolt protocol, and a High-Definition Multimedia Interface protocol, and the second protocol terminal pair is applicable to another one of the USB3 protocol, the USB4 protocol, the DisplayPort protocol, the Thunderbolt protocol, and the High-Definition Multimedia Interface protocol.

7. The USB cable according to claim 1, wherein
  when the signal of the first configuration channel pin comprises a message "Hard_Reset", the first USB repeater selectively returns to a default working mode,
  when the signal of the first configuration channel pin comprises a message "Enter_USB", a working mode of the first USB repeater is selectively switched to a USB working mode,
  when the signal of the first configuration channel pin comprises a message "Data_Reset", the first USB repeater selectively returns to the default working mode,
  when the signal of the first configuration channel pin comprises a message "Enter_Mode", the working mode of the first USB repeater is selectively switched to a DisplayPort protocol mode, a Thunderbolt protocol mode, or a High-Definition Multimedia Interface protocol mode according to a standard/vendor ID,
  when the signal of the first configuration channel pin comprises a message "Exit_Mode", the first USB repeater selectively returns to the default working mode,
  when the signal of the first configuration channel pin comprises a message "DisplayPort_Configure", the working mode of the first USB repeater is switched to a configuration mode to configure an appropriate DisplayPort pin assignment, or
  when the signal of the first configuration channel pin comprises a message "DisplayPort_Status_Update" or "DisplayPort_Attention", the working mode of the first USB repeater is switched to a power-saving mode to save power according to a hot plug detection status.

8. The USB cable according to claim 7, wherein the default working mode comprises a USB3 protocol mode, and the USB working mode comprises a USB2 protocol mode, the USB3 protocol mode, or a USB4 protocol mode.

9. A universal serial bus (USB) repeater without controlled by a USB power delivery controller, comprising:
  a signal repeating circuit adapted to be coupled to a differential pin pair of a USB connector, wherein the signal repeating circuit is configured to gain a signal of the differential pin pair according to at least one operating parameter; and
  a monitor circuit adapted to be coupled to a configuration channel pin of the USB connector for performing a monitoring operation, wherein the monitor circuit selectively adjusts the at least one operating parameter according to a result of the monitoring operation, such that the signal repeating circuit is selectively applicable to one of a plurality of protocols,
  wherein a working mode of the USB repeater is switched based only on the result of the monitoring operation provided by the monitor circuit inside the USB repeater.

10. The USB repeater according to claim 9, wherein the monitor circuit monitors a message transmitted between the configuration channel pin and the USB power delivery controller.

11. The USB repeater according to claim 9, wherein
  when the signal of the configuration channel pin comprises a message "Hard_Reset", the monitor circuit controls the signal repeating circuit to selectively return to a default working mode,
  when the signal of the first configuration channel pin comprises a message "Enter_USB", the monitor circuit selectively switches a working mode of the signal repeating circuit to a USB working mode;
  when the signal of the first configuration channel pin comprises a message "Data_Reset", the monitor circuit controls the signal repeating circuit to selectively return to the default working mode,
  when the signal of the first configuration channel pin comprises a message "Enter_Mode", the monitor circuit selectively switches the working mode of the signal repeating circuit to a DisplayPort protocol mode, a Thunderbolt protocol mode or a High-Definition Multimedia Interface protocol mode according to a standard/vendor ID, when the signal of the first configuration channel pin comprises a message "Exit_Mode", the monitor circuit controls the signal repeating circuit to selectively return to the default working mode, when the signal of the first configuration channel pin comprises a message "DisplayPort_Configure", the monitor circuit switches the working mode of the signal repeating circuit to a configuration mode to configure an appropriate DisplayPort pin assignment, or when the signal of the first configuration channel pin comprises a message "DisplayPort_Status_Update" or "DisplayPort_Attention", the monitor circuit switches the working mode of the signal repeating circuit to a power-saving mode to save power according to a hot plug detection status.

12. The USB repeater according to claim 11, wherein the default working mode comprises a USB3 protocol mode, and the USB working mode comprises a USB2 protocol mode, the USB3 protocol mode, or a USB4 protocol mode.

13. The USB repeater according to claim 9, wherein the signal repeating circuit comprises:

an amplifier comprising a first terminal pair adapted to be coupled to the differential pin pair of the USB connector, wherein the monitor circuit outputs a first operating parameter to the amplifier, such that the amplifier is selectively applicable to one of the protocols; and a routing circuit, comprising a common terminal pair coupled to a second terminal pair of the amplifier, wherein a first selecting terminal pair of a plurality of selecting terminal pairs of the routing circuit is adapted to be coupled to a first protocol terminal pair of a host circuit, a second selecting terminal pair of the selecting terminal pairs of the routing circuit is adapted to be coupled to a second protocol terminal pair of the host circuit, and the monitor circuit outputs a second operating parameter to the routing circuit, such that the routing circuit selects one of the selecting terminal pairs to be coupled to the common terminal pair.

14. The USB repeater according to claim 13, wherein the first protocol terminal pair is applicable to one of a USB3 protocol, a USB4 protocol, a DisplayPort protocol, a Thunderbolt protocol, and a High-Definition Multimedia Interface protocol, and the second protocol terminal pair is applicable to another one of the USB3 protocol, the USB4 protocol, the DisplayPort protocol, the Thunderbolt protocol, and the High-Definition Multimedia Interface protocol.

15. A universal serial bus (USB) device, comprising:
a USB connector;
a USB power delivery controller coupled to a configuration channel pin of the USB connector;
a host circuit coupled to the USB power delivery controller; and
a USB repeater coupled to a first protocol terminal pair and a second protocol terminal pair of the host circuit, wherein the USB repeater is further coupled to a differential pin pair of the USB connector, the USB repeater is configured to gain a signal of the differential pin pair, the USB repeater is configured to perform a monitoring operation on a signal of the configuration channel pin, and the USB repeater selectively runs in one of a plurality of working modes corresponding to a plurality of protocols according to a result of the monitoring operation,
wherein the USB repeater comprises:
a signal repeating circuit coupled to the differential pin pair of the USB connector; and a monitor circuit coupled to the configuration channel pin of the USB connector to perform the monitoring operation, wherein a working mode of the USB repeater is switched based only on the result of the monitoring operation provided by the monitor circuit inside the USB repeater, and a working mode switching of the USB repeater is not controlled by the USB power delivery controller.

16. The USB device according to claim 15, wherein the monitor circuit monitors a message transmitted between the configuration channel pin and the USB power delivery controller.

17. The USB device according to claim 15, wherein when the signal of the configuration channel pin comprises a message "Hard_Reset", the monitor circuit controls the signal repeating circuit to selectively return to a default working mode, when the signal of the first configuration channel pin comprises a message "Enter_USB", the monitor circuit selectively switches a working mode of the signal repeating circuit to a USB working mode, when the signal of the first configuration channel pin comprises a message "Data_Reset", the monitor circuit controls the signal repeating circuit to selectively return to the default working mode, when the signal of the first configuration channel pin comprises a message "Enter_Mode", the monitor circuit selectively switches the working mode of the signal repeating circuit to a DisplayPort protocol mode, a Thunderbolt protocol mode, or a High-Definition Multimedia Interface protocol mode according to a standard/vendor ID, \when the signal of the first configuration channel pin comprises a message "Exit_Mode", the monitor circuit controls the signal repeating circuit to selectively return to the default working mode, when the signal of the first configuration channel pin comprises a message "DisplayPort_Configure", the monitor circuit switches the working mode of the signal repeating circuit to a configuration mode to configure an appropriate DisplayPort pin assignment, or when the signal of the first configuration channel pin comprises a message "DisplayPort_Status_Update" or "DisplayPort_Attention", the monitor circuit switches the working mode of the signal repeating circuit to a power-saving mode to save power according to a hot plug detection status, wherein the default working mode comprises a USB3 protocol mode, and the USB working mode comprises a USB2 protocol mode, the USB3 protocol mode, or a USB4 protocol mode.

18. The USB device according to claim 15,
wherein the signal repeating circuit is configured to gain the signal of the differential pin pair according to at least one operating parameter; and
wherein the monitor circuit selectively adjusts the at least one operating parameter according to the result of the monitoring operation, such that the signal repeating circuit is selectively applicable to one of the protocols.

19. The USB device according to claim 18, wherein the signal repeating circuit comprises:
an amplifier comprising a first terminal pair adapted to be coupled to the differential pin pair of the USB connector, wherein the monitor circuit outputs a first operating parameter to the amplifier, such that the amplifier is selectively applicable to one of the protocols; and a routing circuit comprising a common terminal pair coupled to a second terminal pair of the amplifier, wherein a first selecting terminal pair of a plurality of selecting terminal pairs of the routing circuit is adapted to be coupled to the first protocol terminal pair of the host circuit, a second selecting terminal pair of the selecting terminal pairs of the routing circuit is adapted to be coupled to the second protocol terminal pair of the host circuit, and the monitor circuit outputs a second operating parameter to the routing circuit, such that the routing circuit selects one of the selecting terminal pairs to be coupled to the common terminal pair.

20. The USB device according to claim 15, wherein the first protocol terminal pair is applicable to one of a USB3 protocol, a USB4 protocol, a DisplayPort protocol, a Thunderbolt protocol, and a High-Definition Multimedia Interface protocol, and the second protocol terminal pair is applicable to another one of the USB3 protocol, the USB4 protocol, the DisplayPort protocol, the Thunderbolt protocol, and the High-Definition Multimedia Interface protocol.

* * * * *